(12) United States Patent
Usui (10) Patent No.: US 11,465,559 B2
(45) Date of Patent: Oct. 11, 2022

(54) DISPLAY PROCESSING DEVICE AND DISPLAY CONTROL DEVICE

(71) Applicant: DENSO CORPORATION, Kariya (JP)

(72) Inventor: Syunsuke Usui, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/912,465

(22) Filed: Jun. 25, 2020

(65) Prior Publication Data

US 2020/0324701 A1 Oct. 15, 2020

Related U.S. Application Data

(63) Continuation of application No. PCT/JP2018/047848, filed on Dec. 26, 2018.

(30) Foreign Application Priority Data

Dec. 27, 2017 (JP) .............................. JP2017-251971

(51) Int. Cl.
*G09G 5/00* (2006.01)
*B60R 1/00* (2022.01)
*G06T 11/00* (2006.01)
*H04N 5/247* (2006.01)
*H04N 5/265* (2006.01)

(52) U.S. Cl.
CPC .............. *B60R 1/00* (2013.01); *G06T 11/00* (2013.01); *H04N 5/247* (2013.01); *H04N 5/265* (2013.01); *B60R 2300/105* (2013.01); *B60R 2300/20* (2013.01); *B60R 2300/303* (2013.01); *B60R 2300/607* (2013.01)

(58) Field of Classification Search
CPC ....... G06T 19/006; G06T 19/00; G06F 3/011; G06F 3/012; G02B 27/017
USPC ......................................................... 345/633
See application file for complete search history.

(56) References Cited

U.S. PATENT DOCUMENTS

2010/0020170 A1* 1/2010 Higgins-Luthman ....................... G06K 9/00791
348/135
2014/0333729 A1* 11/2014 Pflug ....................... G06T 15/20
348/47
2016/0165148 A1 6/2016 Itoh et al.

FOREIGN PATENT DOCUMENTS

| JP | 2002-166802 A | 6/2002 |
| JP | 2007-104373 A | 4/2007 |
| JP | 4662832 B2 | 3/2011 |

* cited by examiner

*Primary Examiner* — Gordon G Liu
(74) *Attorney, Agent, or Firm* — Maschoff Brennan (57) ABSTRACT

One aspect of the present disclosure is a display processing device including an acquisition unit, a synthesis unit, and a display unit. The acquisition unit is configured to acquire a plurality of images captured by a plurality of cameras provided at a plurality of different positions on a vehicle, the captured images having an overlapping part in which imaging areas of the cameras partially overlap with each other. The synthesis unit combines the captured images acquired by the acquisition unit at the overlapping part of the captured images. The display unit displays the image synthesized by the synthesis unit on a display device mounted on the vehicle. The synthesis unit changes a position of a synthetic boundary, which is a boundary used when combining the captured images, as time passes.

11 Claims, 9 Drawing Sheets

DISPLAY PROCESSING DEVICE AND DISPLAY CONTROL DEVICE

CROSS-REFERENCE TO RELATED APPLICATION

This application is the U.S. bypass application of International Application No. PCT/JP2018/047848 filed on Dec. 26, 2018 which designated the U.S. and claims priority to Japanese Patent Application No. 2017-251971, filed on Dec. 27, 2017, the contents of both of which are incorporated herein by reference.

TECHNICAL FIELD

The present disclosure relates to a display processing device and a display control device mounted on vehicles.

BACKGROUND

JP 4662832 B discloses a display processing device configured to display a plurality of captured images obtained by a plurality of cameras provided at a plurality of different positions on a vehicle on a display device provided in the vehicle. This display processing device combines captured images whose imaging areas partially overlap with each other into a single image by superimposing the overlapping parts on top of each other, and displays the synthesized image on a display device. Further, the display processing device determines the driving state of the vehicle such as whether the vehicle is traveling straight at a constant speed or turning to the right or to the left instead of traveling straight. Then, based on the determined driving state, the display processing device changes the position of the synthetic boundary, which is the boundary used when synthesizing captured images.

SUMMARY

One aspect of the present disclosure is a display processing device including an acquisition unit, a synthesis unit, and a display unit. The acquisition unit is configured to acquire a plurality of images captured by a plurality of cameras provided at a plurality of different positions on a vehicle, the captured images having an overlapping part in which imaging areas of the cameras partially overlap with each other. The synthesis unit is configured to combine the captured images acquired by the acquisition unit at the overlapping part of the captured images. The display unit is configured to display the image synthesized by the synthesis unit on a display device mounted on the vehicle. The synthesis unit changes a position of a synthetic boundary, which is a boundary used when combining the captured images, as time passes.

Another aspect of the present disclosure is a display processing device including an acquisition unit, a synthesis unit, and a display unit. The acquisition unit and the display unit are the same as those described above. The synthesis unit is configured to combine the captured images acquired by the acquisition unit at the overlapping part of the captured images. Further, the synthesis unit combines the captured images such that the transparency of the overlapping part of at least one of the captured images combined with each other changes as time passes.

Another aspect of the present disclosure a display control device included in a vicinity display processing system configured to present to a driver a captured image showing surroundings of a vehicle, the display processing system also including a plurality of cameras provided at a plurality of different positions on the vehicle and a display device mounted on the vehicle. The display control device includes an acquisition processing unit, a memory, a computing device, and a display processing unit. The acquisition processing unit is connected to the cameras and is configured to acquire a plurality of images, captured by the cameras, having an overlapping part in which imaging areas of the cameras partially overlap with each other. The memory stores a synthesis program which combines the captured images acquired by the acquisition processing unit at the overlapping part of the captured images. The computing device is configured to read out the synthesis program from the memory and execute the synthesis program. The display processing unit is connected to the display device and is configured to output to the display device an image synthesized through the execution of the synthesis program by the computing device. The memory further stores a time boundary position change program which changes a position of a synthetic boundary, which is a boundary used when the captured images are synthesized, as time passes.

Another aspect of the present disclosure a display control device included in a vicinity display processing system configured to present to a driver a captured image showing surroundings of a vehicle, the display processing system also including a plurality of cameras provided at a plurality of different positions on the vehicle and a display device mounted on the vehicle. The display control device includes an acquisition processing unit, a memory, and a display processing unit. The acquisition processing unit and the display processing unit are the same as those described above. The memory stores a synthesis program which combines the captured images acquired by the acquisition processing unit at the overlapping part of the captured images. The memory also stores a transparency change program which combines the captured images such that the transparency of the overlapping part of at least one of the captured images combined with each other changes as time passes.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

As a result of detailed examination by the inventor, the following problem was found in JP 4662832 B. The plurality of captured images are images captured by a plurality of cameras provided at a plurality of different positions on the vehicle. For this reason, the way an object having some height such as a person or a vehicle appears in the overlapping parts of the captured images would differ from each other. Therefore, when an object having some height exists near the synthetic boundary in the overlapping parts, a part of the object which should be displayed may disappear from the display screen. As a result, the driver may erroneously recognize that there is no object around the vehicle even though there is an object.

An objective of the present disclosure is to provide a display processing device and a display control device capable of preventing a driver from erroneously recognizing that there is no object around the vehicle even though there is an object.

One aspect of the present disclosure is a display processing device including an acquisition unit, a synthesis unit, and a display unit. The acquisition unit is configured to acquire a plurality of images captured by a plurality of cameras provided at a plurality of different positions on a vehicle, the captured images having an overlapping part in which imaging areas of the cameras partially overlap with each other. The synthesis unit is configured to combine the captured images acquired by the acquisition unit at the overlapping part of the captured images. The display unit is configured to display the image synthesized by the synthesis unit on a display device mounted on the vehicle. The synthesis unit changes a position of a synthetic boundary, which is a boundary used when combining the captured images, as time passes.

According to such configuration, even if an object exists near the synthetic boundary at a certain time and a part of the object does not appear on the display screen, the position of the synthetic boundary changes as time passes so that the synthetic boundary moves away from the object. As a result, the object appears on the display screen. Thus, it is possible to prevent the driver from erroneously recognizing that there is no object around the vehicle.

Another aspect of the present disclosure is a display processing device including an acquisition unit, a synthesis unit, and a display unit. The acquisition unit and the display unit are the same as those described above. The synthesis unit is configured to combine the captured images acquired by the acquisition unit at the overlapping part of the captured images. Further, the synthesis unit combines the captured images such that the transparency of the overlapping part of at least one of the captured images combined with each other changes as time passes.

According to such configuration, even if a part of an object does not appear on the display screen at a certain time, the transparency of the captured images changes in the overlapping part as time passes so as to display captured images that show the part of the object that was lost. Therefore, it is possible to prevent the driver from erroneously recognizing that there is no object around the vehicle.

Another aspect of the present disclosure a display control device included in a vicinity display processing system configured to present to a driver a captured image showing surroundings of a vehicle, the display processing system also including a plurality of cameras provided at a plurality of different positions on the vehicle and a display device mounted on the vehicle. The display control device includes an acquisition processing unit, a memory, a computing device, and a display processing unit. The acquisition processing unit is connected to the cameras and is configured to acquire a plurality of images, captured by the cameras, having an overlapping part in which imaging areas of the cameras partially overlap with each other. The memory stores a synthesis program which combines the captured images acquired by the acquisition processing unit at the overlapping part of the captured images. The computing device is configured to read out the synthesis program from the memory and execute the synthesis program. The display processing unit is connected to the display device and is configured to output to the display device an image synthesized through the execution of the synthesis program by the computing device. The memory further stores a time boundary position change program which changes a position of a synthetic boundary, which is a boundary used when the captured images are synthesized, as time passes.

According to such configuration, the same effects as those of the display processing device described above can be obtained.

Another aspect of the present disclosure a display control device included in a vicinity display processing system configured to present to a driver a captured image showing surroundings of a vehicle, the display processing system also including a plurality of cameras provided at a plurality of different positions on the vehicle and a display device mounted on the vehicle. The display control device includes an acquisition processing unit, a memory, and a display processing unit. The acquisition processing unit and the display processing unit are the same as those described above. The memory stores a synthesis program which combines the captured images acquired by the acquisition processing unit at the overlapping part of the captured images. The memory also stores a transparency change program which combines the captured images such that the transparency of the overlapping part of at least one of the captured images combined with each other changes as time passes.

According to such configuration, the same effects as those of the display processing device described above can be obtained.

Embodiments for implementing the present disclosure will be described with reference to the drawings.

1. First Embodiment

1-1. Configuration

Figure 1:
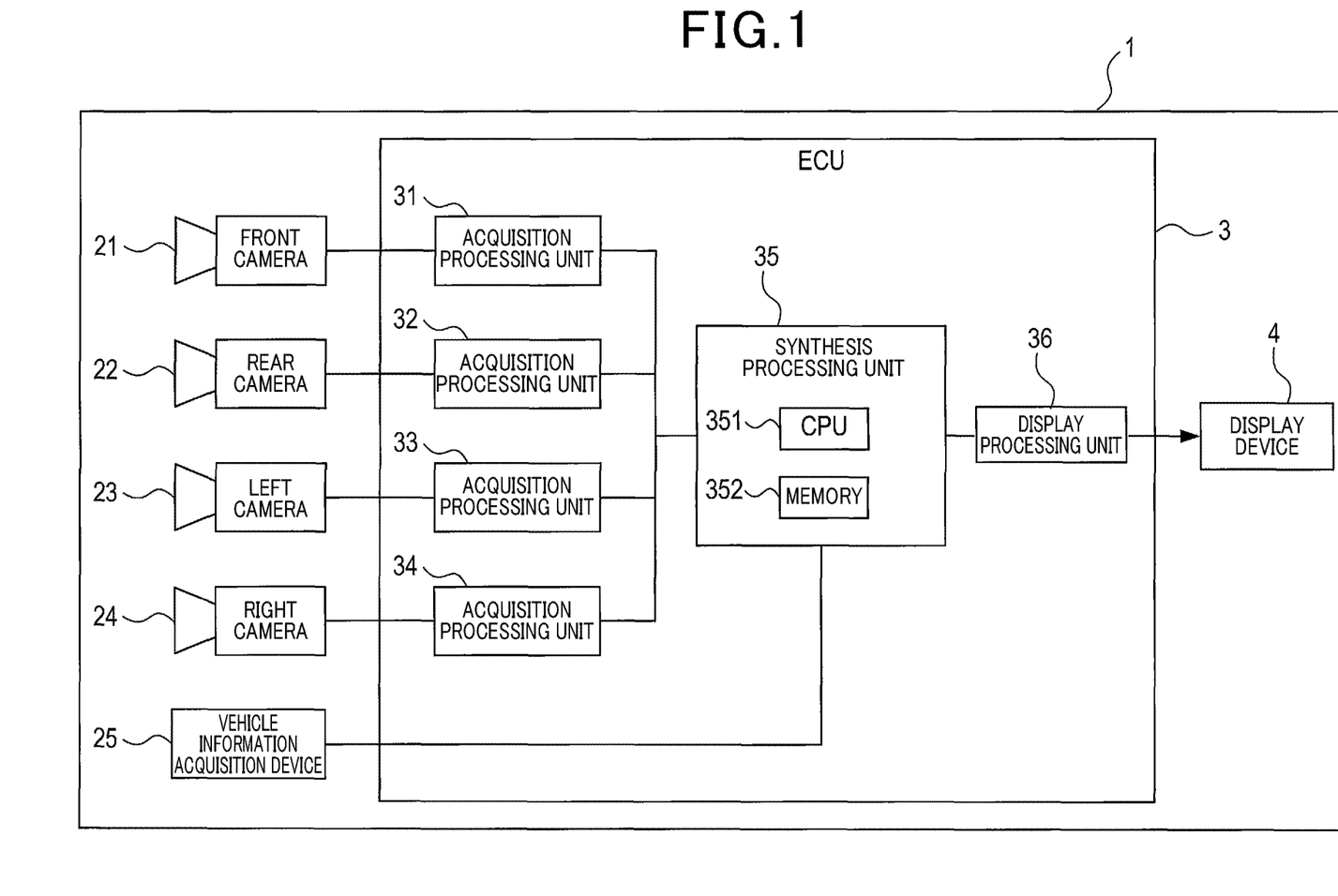
FIG. 1 is a block diagram illustrating the configuration of a display processing system.

A display processing system 1 shown in FIG. 1 is mounted on a vehicle, and includes a front camera 21, a rear camera 22, a left camera 23, a right camera 24, a vehicle information acquisition device 25, an ECU 3, and a display device 4. In the following, when simply described as "vehicle", it indicates a vehicle on which the display processing system 1 is mounted.

Figure 2:
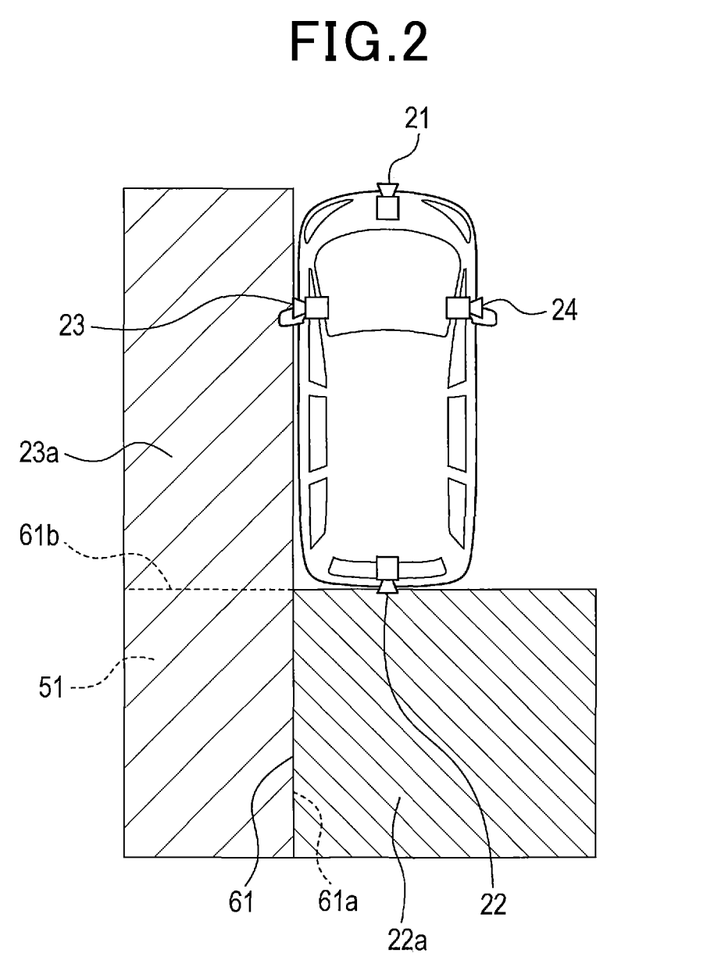
FIG. 2 is a diagram illustrating the change in the position of the synthetic boundary as time passes.
Figure 3:
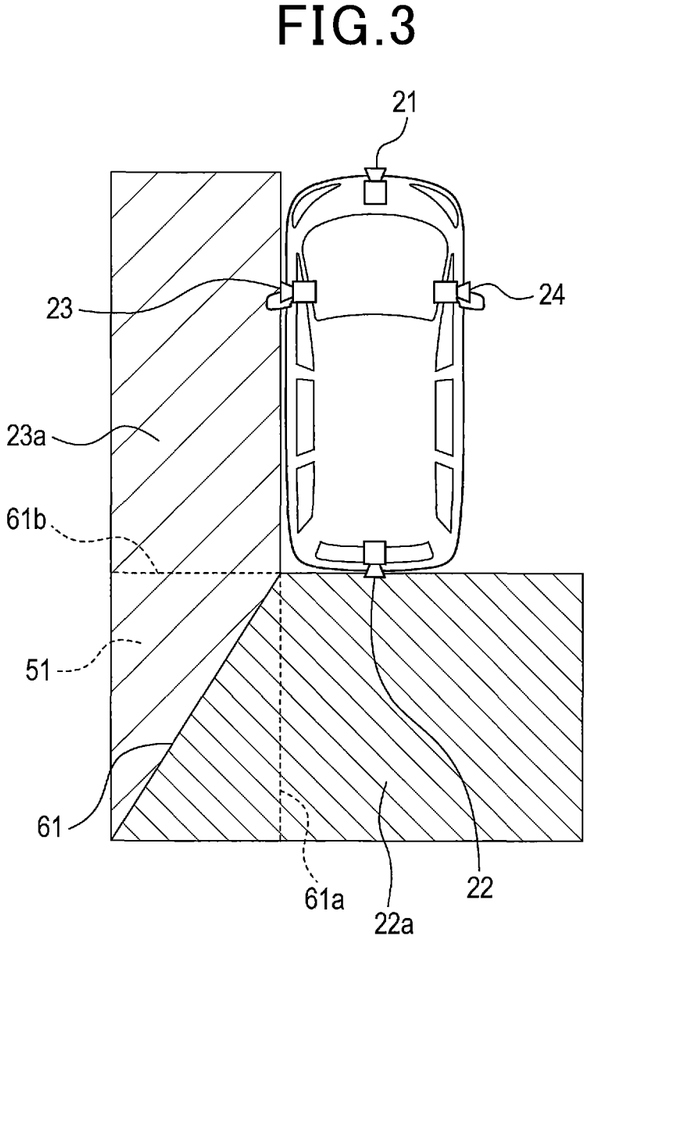
FIG. 3 is another diagram illustrating the change in the position of the synthetic boundary as time passes.
Figure 4:
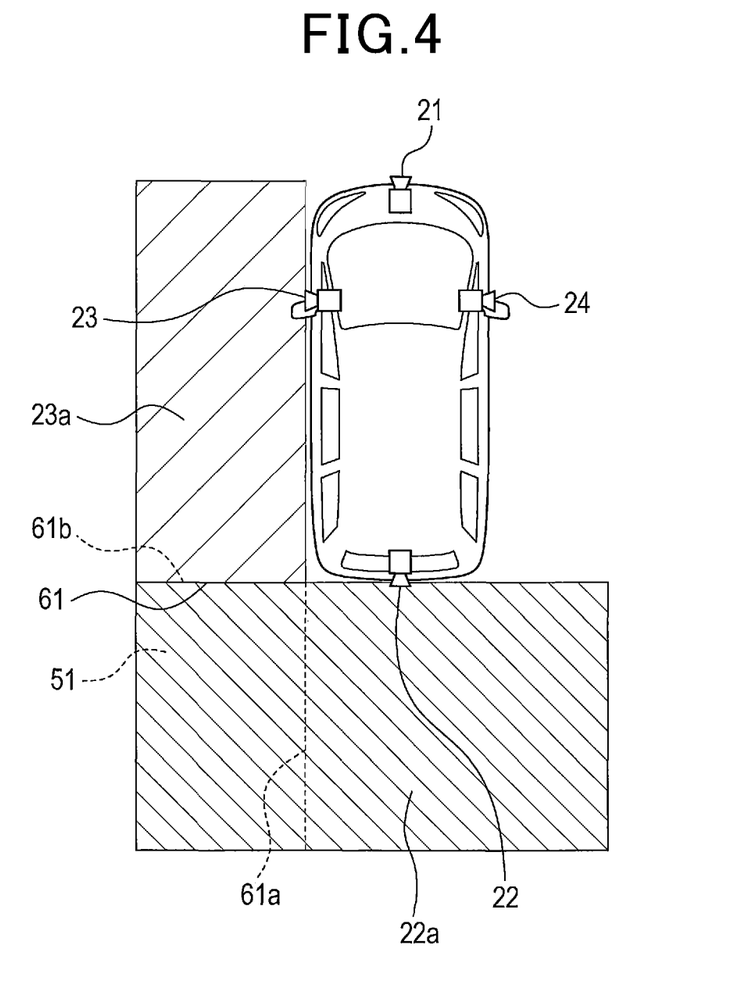
FIG. 4 is yet another diagram illustrating the change in the position of the synthetic boundary as time passes.

The front camera 21, the rear camera 22, the left camera 23, and the right camera 24 output signals representing the captured images to the ECU 3. As shown in FIGS. 2 to 4, the cameras 21 to 24 are provided at a plurality of different positions on the vehicle. Specifically, the front camera 21 is provided at the front part of the vehicle, the rear camera 22 is provided at the rear part of the vehicle, the left camera 23 is provided at the left part of the vehicle, and the right camera 24 is provided at the right part of the vehicle.

The cameras 21 to 24 are provided such that the areas they can cover partially overlap with each other in each of the front region and the rear region of the vehicle. Specifically, each of the cameras 21 to 24 is a wide-angle camera capable of capturing an image at a view angle of about 180 degrees. Therefore, the areas that can be covered by the left camera 23 and the right camera 24 partially overlap with the area that can be covered by the front camera 21 on the front side of the vehicle, and they partially overlap with the area that can be covered by the rear camera 22 on the rear side of the vehicle.

In the present embodiment, the cameras 21 to 24 are used to display a bird's-eye image, which is an image as viewed from above the vehicle, on the display device 4. That is, the images captured by the cameras 21 to 24 are viewpoint-converted to generate bird's-eye images as viewed from above the vehicle. Then, a synthesized image obtained by synthesizing the generated bird's-eye images is displayed on the display device 4.

FIGS. 2 to 4 show an imaging area 22a of the rear camera 22, an imaging area 23a of the left camera 23, and an overlapping part 51 of the imaging area 22a and the imaging area 23a. The overlapping part 51 is a zone of the imaging area 22a on the left of a broken line 61a in FIGS. 2 to 4. In addition, the overlapping part 51 is a zone of the imaging area 23a below a broken line 61b.

Returning to FIG. 1, the vehicle information acquisition device 25 includes various sensors configured to detect an object such as a person or a vehicle around the vehicle. The various sensors are, for example, a millimeter wave radar, a laser radar, a sonar, and the like. The vehicle information acquisition device 25 outputs vehicle information, which is information indicating the detection results of the various sensors, to the ECU 3.

The ECU 3 includes acquisition processing units 31 to 34, a synthesis processing unit 35, and a display processing unit 36. Note that ECU stands for Electronic Control Unit.

The acquisition processing units 31 to 34 are interfaces for outputting signals representing captured images input from the cameras 21 to 24 to the synthesis processing unit 35.

The main component of the synthesis processing unit 35 is a of well-known microcomputer including a CPU 351 and a semiconductor memory such as RAM, ROM, or flash memory (hereinafter also referred to as a memory 352). The various functions of the synthesis processing unit 35 are realized by the CPU 351 by executing programs stored in a non-transitory computer readable storage medium. In this example, the memory 352 corresponds to the non-transitory computer readable storage medium for storing programs. The memory 352 stores a synthesizing program which is a computer program for synthesizing a plurality of captured images acquired by the acquisition processing units 31 to 34 at the overlapping parts of the captured images. The memory 352 also stores a time boundary position change program which is a computer program that changes the position of a synthetic boundary, which is a boundary used when synthesizing captured images, as time passes. By executing the synthesis program and the time boundary position change program, a method corresponding to these programs is executed. Specifically, in accordance with the synthesis program and the time boundary position change program, the synthesis processing unit 35 executes image synthesis processing shown in FIG. 5 which will be described later. The number of microcomputers constituting the synthesis processing unit 35 may be one or greater. The way of realizing these elements constituting the synthesis processing unit 35 is not limited to software, and a part or all of the elements may be realized by using hardware combining logic circuits, analog circuits, and the like. The synthesis processing unit 35 outputs a signal representing an image to be displayed on the display device 4 to the display processing unit 36.

The display processing unit 36 is an interface for outputting the signal representing the image input by the synthesis processing unit 35 to the display device 4.

The display device 4 is a display for displaying an image. The display device 4 is provided at a position that allows the driver of the vehicle or the like to view the displayed image.

1-2. Processing

Next, the image synthesis processing executed by the synthesis processing unit 35 will be described with reference to the flowchart of FIG. 5. The image synthesis processing is periodically executed while the power of the ECU 3 is on.

In S101, the synthesis processing unit 35 acquires signals representing images captured by the front camera 21, the rear camera 22, the left camera 23, and the right camera 24 via the acquisition processing units 31 to 34.

In S102, the synthesis processing unit 35 combines the captured images of the cameras 21 to 24 acquired in S101 to generate a synthesized image. The synthesis processing unit 35 generates the synthesized image in the following manner.

First, the synthesis processing unit 35 converts the viewpoint of the captured images of the cameras 21 to 24 into a viewpoint from above the vehicle to generate bird's-eye images. Then, it combines the generated bird's-eye images of the cameras 21 to 24 so that the overlapping parts of the bird's-eye images overlap with each other, and thus a synthesized image is generated as a bird's-eye image showing the surroundings of the vehicle. In the present embodiment, the synthesis processing unit 35 combines a plurality of captured images as follows.

That is, the synthesis processing unit 35 combines a plurality of captured images in such a manner that the position of the synthetic boundary, which is a boundary used when the captured images are combined, changes as time passes. That is, the captured images are combined in such a manner that, each time the image synthesis process is periodically performed, the position of the synthetic boundary changes.

Specifically, the position of the synthetic boundary changes as time passes between a first boundary position and a second boundary position included in the overlapping part. In the present embodiment, the overlapping part coincides with the range over which the position of the synthetic boundary changes (hereinafter referred to as the boundary change range). That is, the position of the synthetic boundary at which one of the plurality of captured images whose imaging areas overlap with each other is displayed in a complete form is set as the first boundary position. Similarly, the position of the synthetic boundary at which the other captured image is displayed in a complete form is set as the second boundary position. The position of the synthetic boundary 61 gradually (i.e., stepwise) changes from one of the first boundary position and the second boundary position to the other. When the position of the synthetic boundary reaches the other boundary position, the position of the synthetic boundary is changed toward the other boundary position. The position of the synthetic boundary moves between the first boundary position and the second boundary position in such an alternating manner. In other words, in the present embodiment, the position of the synthetic boundary changes such that it passes through an intermediate position between the first boundary position and the second boundary position.

For example, FIGS. 2 to 4 show changes in the position of the synthetic boundary 61 in connection with the synthesis of an image captured by the rear camera 22 and an image captured by the left camera 23. In FIG. 2, the synthetic boundary 61 is positioned at the first boundary position 61a at which the image captured by the left camera 23 is displayed in a complete form. Then, as time passes, the position of the synthetic boundary 61 changes from the first boundary position 61a shown in FIG. 2 to the intermediate position shown in FIG. 3. After a further lapse of time, the position of the synthetic boundary 61 changes from the intermediate position shown in FIG. 3 to the second boundary position 61b at which the image captured by the rear camera 22 shown in FIG. 4 is displayed in a complete form. After a further lapse of time, the position of the synthetic boundary 61 similarly changes from the second boundary position 61b shown in FIG. 4 to the first boundary position 61a shown in FIG. 2. The synthesis processing unit 35 repeats such changing as time passes.

As described above, in the present embodiment, on the display screen of the display device 4, the position of the synthetic boundary is changed by changing the ratio of the display areas of the captured images in the overlapping part. That is, in the example shown in FIGS. 2 to 4, the position of the synthetic boundary 61 is changed such that the ratio of the display area of the image captured by the left camera 23 in the overlapping part 51 is gradually reduced from FIG. 2 to FIG. 4 whereas the ratio of the display area of the image captured by the rear camera 22 in the overlapping part 51 is gradually increased. Thus, the synthesis processing unit 35 keeps moving the position of the synthetic boundary like scanning.

Note that the same applies to the change of the position of the synthetic boundary in the synthesis of images captured by the front camera 21 and the left camera 23, the rear camera 22 and the right camera 24, and the right camera 24 and the front camera 21.

Figure 6:
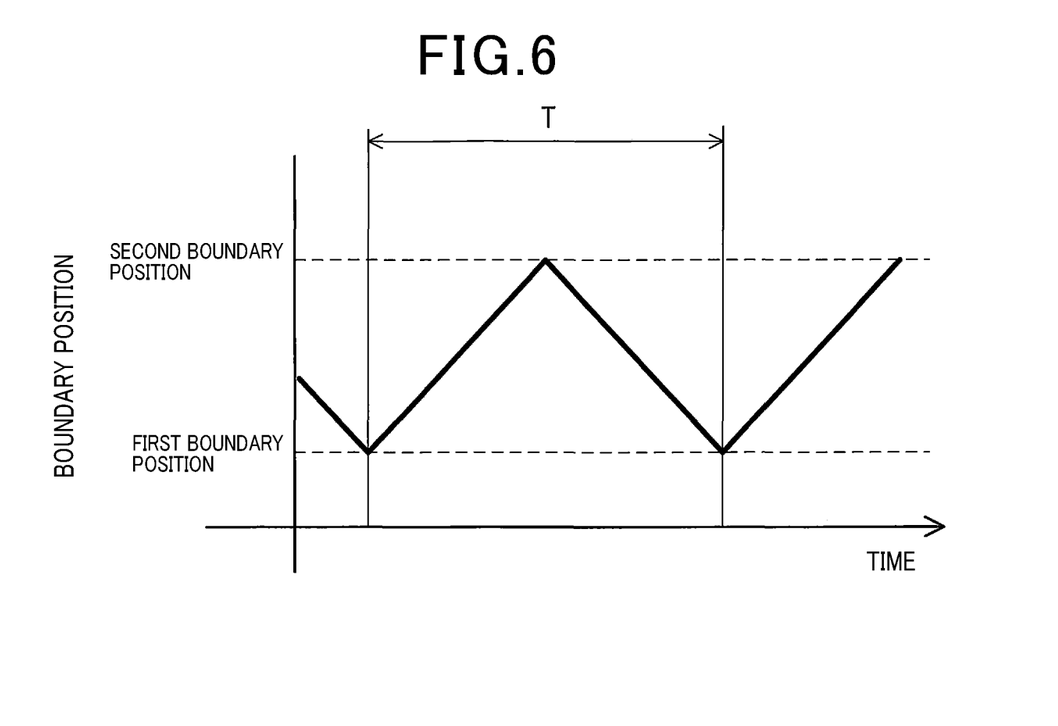
FIG. 6 is a diagram showing the relationship between time and the position of the synthetic boundary.

Further, in the present embodiment, the position of the synthetic boundary changes gradually (i.e., gently) with time. Specifically, as shown in FIG. 6, the position of the synthetic boundary changes at a constant speed (i.e., linearly) from one of the first boundary position and the second boundary position toward the other. Note that, in FIG. 6, the time T of one cycle in which the position of the synthetic boundary starts from the first boundary position and returns to the first boundary position again is set to a relatively short time that prevents the driver from erroneously recognizing the presence or absence of an object. The synthesis processing unit 35 generates the synthesized image in the above-described manner.

In S103, the synthesis processing unit 35 displays the generated synthesized image on the display device 4 via the display processing unit 36. After executing S103, the synthesis processing unit 35 ends the image synthesis processing.

1-3. Effects

According to the first embodiment described above in detail, the following effects can be obtained.

(1a) In the present embodiment, the synthesis processing unit 35 changes the position of the synthetic boundary as time passes. Therefore, even if an object exists near the synthetic boundary at a certain time and a part of the object does not appear on the display screen, the position of the synthetic boundary changes as time passes, and the synthetic boundary moves away from the object. As a result, the object appears on the display screen. Thus, it is possible to prevent the driver from erroneously recognizing that there is no object around the vehicle.

Further, for example, a configuration can be considered that changes the position of the synthetic boundary so as not to overlap with the object only when an object is detected around the vehicle by a sensor provided in the vehicle. However, this configuration requires a sensor for detecting an object. On the other hand, in the present embodiment, it is possible to prevent the synthetic boundary from being located near an object without using a sensor. Since it does not require a sensor, the cost can be superior as compared with the above-described configuration.

(1b) In the present embodiment, the synthesis processing unit 35 changes the position of the synthetic boundary 61 between the first boundary position 61a and the second boundary position 61b via an intermediate state. The intermediate state is a state between the state where the synthetic boundary is located at the first boundary position and the state where the synthetic boundary is located at the second boundary position. Specifically, the synthesis processing unit 35 changes the position of the synthetic boundary 61 so that it passes through an intermediate position which is a position between the first boundary position 61a and the second boundary position 61b. Therefore, it is possible to reduce the sense of strangeness the driver feels when the position of the synthetic boundary 61 changes.

That is, for example, a configuration can be conceived that switches the position of the synthetic boundary 61 instantaneously between the first boundary position 61a and the second boundary position 61b without passing through the intermediate state. In this configuration, the display screen of the display device 4 switches alternately between a synthesized image in which the position of the synthetic boundary 61 is the first boundary position 61a and a synthesized image in which the position of the synthetic boundary 61 is the second boundary position 61b. When the driver sees such an image, the driver may feel a sense of strangeness. On the other hand, in the present embodiment, since the position of the synthetic boundary 61 changes through the intermediate state, the display screen of the display device 4 changes more smoothly than the above configuration does. Therefore, it is possible to reduce the sense of strangeness the driver feels as compared with the above configuration.

(1c) In the present embodiment, the position of the synthetic boundary 61 is changed by changing the ratio of the display areas of the captured images in the overlapping part 51. This allows the appearance of the display screen to improve.

That is, as with a second embodiment described later, a configuration can be conceived that changes the position of the synthetic boundary 61 by changing the transparency of the captured images in the overlapping part 51. In such a configuration, in the transition period in which the transparency is changing, the captured images of all of the cameras appear in the overlapping part 51 on the display screen. In addition, since the cameras are provided at different positions, the manner in which the same object appears differs for each camera. Therefore, in the transition period, the same object may be doubled in the overlapping part 51. On the other hand, according to the configuration of the present embodiment, images captured by different cameras are not displayed in the overlapping part 51 in a superimposed manner in contrast to the above configuration, so that such double image of the same object can be suppressed from occurring. This allows the appearance of the displayed image to improve.

It should be noted that in the present embodiment, the synthesis processing unit 35 corresponds to a display processing device, the ECU 3 corresponds to a display control device, the CPU 351 corresponds to a computing device, S101 corresponds to processing as an acquisition unit, S102 corresponds to processing as a synthesis unit, and S103 corresponds to processing as a display unit.

2. Second Embodiment 2-1. Differences from First Embodiment

Since the basic configuration of the second embodiment is the same as that of the first embodiment, the description of the common parts will be omitted, and the differences will be mainly described. Reference numbers that are the same as those of the first embodiment denote structures that are the same, and the preceding explanations should be referred to.

In the first embodiment described above, the position of the synthetic boundary is changed by changing the ratio of the display areas of the captured images in the overlapping part. The second embodiment differs from the first embodiment in that the position of the synthetic boundary is changed by changing the transparency of the captured images in the overlapping part.

The display processing system 1 of the second embodiment has the same hardware configuration as the display processing system 1 of the above-described first embodiment. However, the image synthesis processing executed by the synthesis processing unit 35 of the second embodiment is partially different from that of the first embodiment. Specifically, the memory 352 of the second embodiment stores a transparency change program instead of the time boundary position change program of the first embodiment. That is, the memory 352 stores the synthesis program and the transparency change program. The transparency change program is a computer program that combines a plurality of captured images such that the transparency of at least one of the captured images to be combined changes as time passes in the overlapping part.

By executing the synthesis program and the transparency change program, a method corresponding to these programs is executed. Specifically, in accordance with the synthesis program and transparency change program, the synthesis processing unit 35 executes the image synthesis processing shown in FIG. 5 described earlier.

2-2. Processing

Next, the image synthesis processing executed by the synthesis processing unit 35 of the second embodiment will be described with reference to the flowchart of FIG. 5 described earlier. Note that the processing of S101 and S103 in FIG. 5 is the same as that of the first embodiment, and therefore, only the processing of S102 which is a difference will be described below.

In S102, the synthesis processing unit 35 combines the captured images of the cameras 21 to 24 acquired in S101 to generate a synthesized image. As in the first embodiment, the synthesis processing unit 35 generates a bird's-eye image by performing viewpoint conversion on each captured image, and synthesizes the generated bird's-eye images.

In the present embodiment, the synthesis processing unit 35 changes the position of the synthetic boundary by changing the transparency of both of the plurality of captured images overlapping in the overlapping part. That is, each time the image synthesis process is periodically performed, the transparency of the captured images in the overlapping part changes.

Specifically, the synthesis processing unit 35 combines the captured images such that their overlapping parts overlap with each other. Then, as time passes, the synthesis processing unit 35 lowers the transparency of one of the overlapping captured images in the overlapping part and increases the transparency of the other captured image in the overlapping part so that the position of the synthetic boundary changes from one of the first and second boundary positions to the other. In the present embodiment, when one of the captured images is displayed in a complete form in the overlapping part, the transparency of the first captured image is 0. In the same state, the transparency of the other captured image is 100. From this state, the synthesis processing unit 35 increases the transparency of the first captured image and decreases the transparency of the other captured image so as to generate a synthesized image in which the transparency of the one captured image is 100 (that is, the other captured image is displayed in a complete form).

Figure 7:
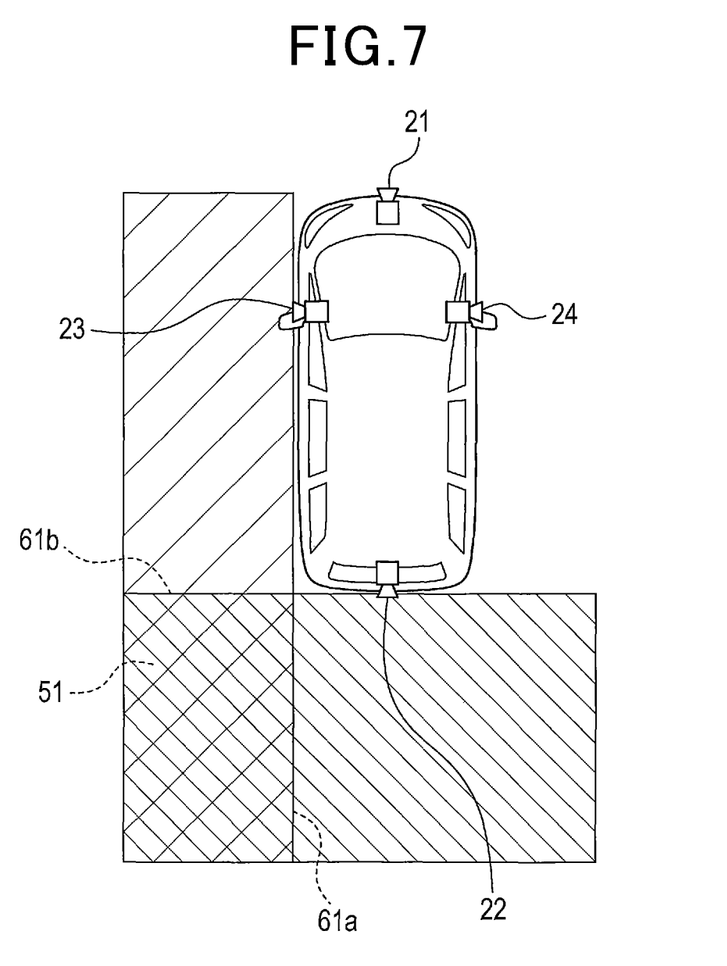
FIG. 7 is a diagram showing the change in the transparency of the captured images as time passes.

For example, in a state where the captured image of the left camera 23 shown in FIG. 2 is displayed in a complete form, the transparency of the captured image of the left camera 23 in the overlapping part 51 is 0. The transparency of the image captured by the rear camera 22 in the overlapping part 51 is 100. From this state, the synthesis processing unit 35 gradually increases the transparency of the image captured by the left camera 23 and gradually decreases the transparency of the image captured by the rear camera 22 as time passes. As a result, as shown in FIG. 7, a synthesized image in which the captured image of the left camera 23 and the captured image of the rear camera 22 are mixed (that is, two captured images are simultaneously displayed) is generated. In the state of FIG. 7, for example, the transparency of the captured image of the left camera 23 is 50, and the transparency of the captured image of the rear camera 22 is also 50. From this state, the transparency of the captured image of the left camera 23 is gradually increased, and the transparency of the captured image of the rear camera 22 is gradually reduced as more time passes. Then, when the transparency of the captured image of the left camera 23 becomes 100 and the transparency of the captured image of the rear camera 22 becomes 0, a synthesized image as shown in FIG. 4 in which the captured image of the rear camera 22 is displayed in a complete form is generated. The position of the synthetic boundary 61 changes from the first boundary position 61a to the second boundary position 61b via the intermediate state as shown in FIG. 7 in such manner. After a further lapse of time, the synthesis processing unit 35 similarly changes the position of the synthetic boundary 61 from the second boundary position 61b to the first boundary position 61a. The synthesis processing unit 35 repeats such changing as time passes. In addition, in the present embodiment, the synthesis processing unit 35 changes the transparency at a constant speed (at a constant rate). The synthesis processing unit 35 generates the synthesized image in the above-described manner.

2-3. Effects

According to the second embodiment described above in detail, the following effects can be obtained in addition to the above-described effects (1a) to (1b) of the first embodiment.

In the present embodiment, the synthesis processing unit 35 changes the position of the synthetic boundary by changing the transparency of both of the plurality of captured images in the overlapping part 51. Therefore, it is possible to prevent occurrence of partial loss of an object on the display screen.

That is, in the configuration of the first embodiment in which the ratio of the display areas of the captured images is changed, a part of an object near the synthetic boundary may be lost from the display screen in cases such as when the synthetic boundary is located at an intermediate position. On the other hand, according to the configuration of the present embodiment, in the transition period in which the transparency is changing, the position of the synthetic boundary is ambiguous in the overlapping part, and the overlapping captured images are seamlessly connected to each other. Therefore, all of the captured images are displayed on the display screen. This makes it possible to suppress occurrence of the above-described partial loss of an object near the synthetic boundary.

3. Third Embodiment

3-1. Differences from First Embodiment

Since the third embodiment has the same basic configuration as the first embodiment, the description of the common aspects will be omitted, and the differences will be discussed mainly. Reference numbers that are the same as those of the first embodiment denote structures that are the same, and the preceding explanations should be referred to.

In the first embodiment described above, the position of the synthetic boundary changes as time passes irrespective of the presence or absence of an object around the vehicle. On the other hand, the third embodiment is different from the first embodiment in that it further has a function of changing the position of the synthetic boundary so that it does not overlap with an object when a sensor detects the object around the vehicle.

The display processing system 1 according to the third embodiment has the same hardware configuration as the display processing system 1 according to the above-described first embodiment. However, the image synthesis processing executed by the synthesis processing unit 35 of the third embodiment is partially different from that of the first embodiment. Specifically, the memory 352 of the third embodiment stores, in addition to the synthesis program and the time boundary position change program, a sensor boundary position change program. The sensor boundary position change program is a computer program for changing the position of the synthetic boundary so that it does not overlap with the object when an object is detected around the vehicle by a sensor. By executing the synthesis program, the time boundary position change program, and the sensor boundary position change program, a method corresponding to these programs is executed. Specifically, in accordance with the synthesis program, the time boundary position change program, and the sensor boundary position change program, the synthesis processing unit 35 executes the image synthesis processing shown in FIG. 5 described earlier.

3-2. Processing

Next, the image synthesis processing executed, instead of the image synthesis processing of the first embodiment shown in FIG. 5, by the synthesis processing unit 35 of the third embodiment will be described with reference to the flowchart of FIG. 8.

Figure 5:
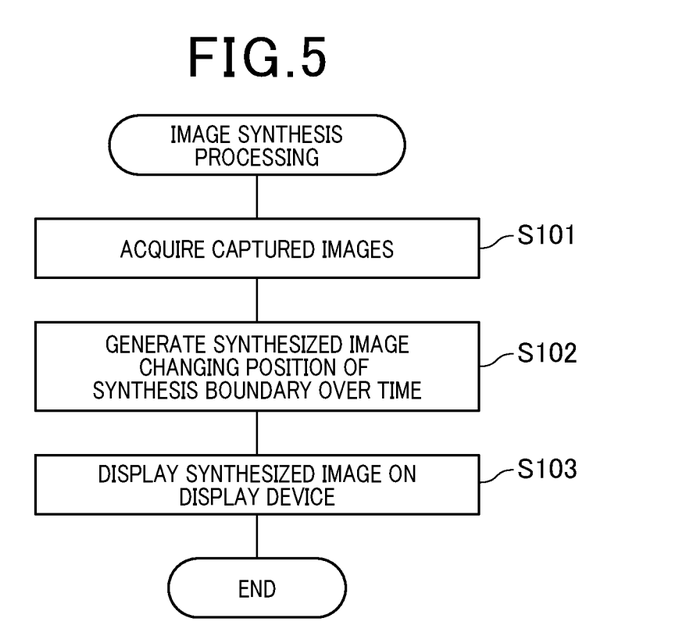
FIG. 5 is a flowchart of the image synthesis processing according to first and second embodiments.
Figure 8:
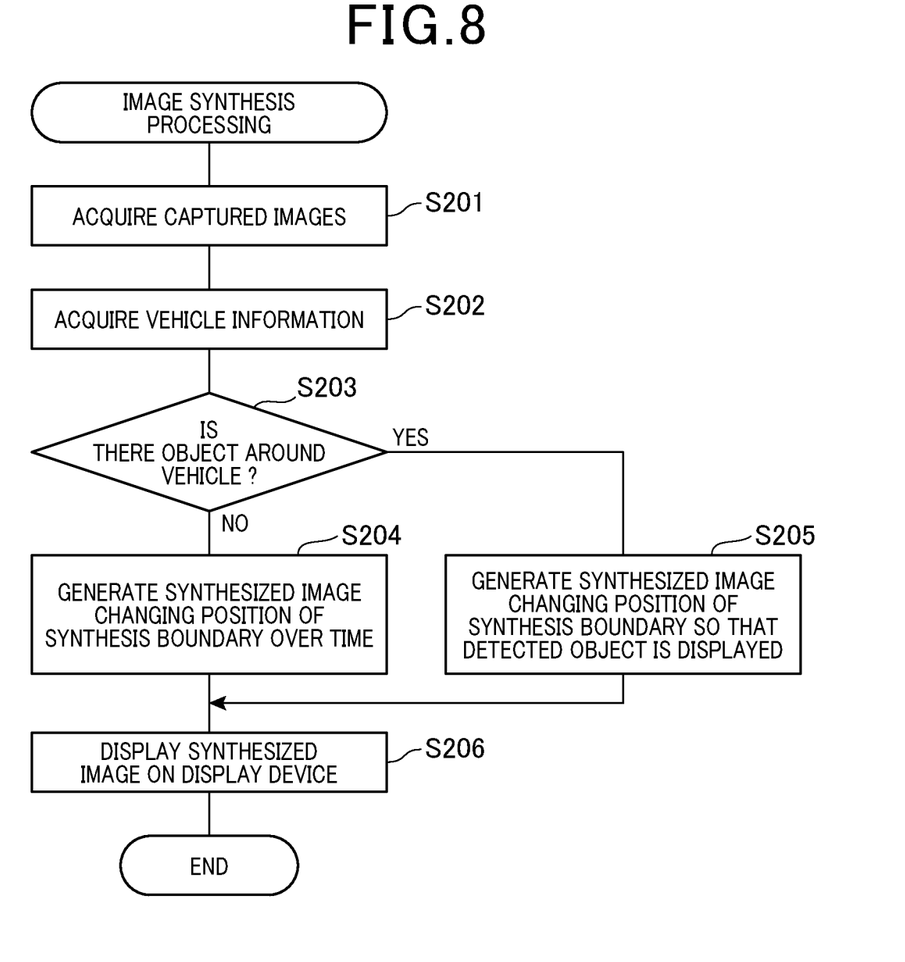
FIG. 8 is a flowchart of the image synthesis processing according to a third embodiment.

Since S201 in FIG. 8 is the same processing as step S101 in FIG. 5, and its description will be omitted.

In S202, the synthesis processing unit 35 acquires vehicle information from the vehicle information acquisition device 25.

In S203, the synthesis processing unit 35 determines whether an object exists around the vehicle based on the vehicle information acquired in S202. Specifically, the synthesis processing unit 35 determines whether an object exists in an overlapping part of the imaging areas of the cameras 21 to 24.

When the synthesis processing unit 35 determines that there is no object around the vehicle, the process proceeds to S204. In S204, the synthesis processing unit 35 generates a synthesized image changing the position of the synthetic boundary as time passes, as in S102 of FIG. 5 described above. After executing S204, the synthesis processing unit 35 proceeds to S206 described later.

On the other hand, when the synthesis processing unit 35 determines that there is an object around the vehicle in step S203 described above, the process proceeds to S205.

In S205, the synthesis processing unit 35 generates a synthesized image changing the position of the synthetic boundary so that the detected object is displayed on the display screen of the display device 4.

Specifically, when an object is detected in an overlapping part, the synthesis processing unit 35 changes the position of the synthetic boundary so that the synthetic boundary does not overlap with the object. In the present embodiment, when an object is detected in an overlapping part, the synthesis processing unit 35 moves the synthetic boundary to one of the first boundary position and the second boundary position that is located on the side opposite to the detected object with respect to the position of the synthetic boundary at that time, so that the synthetic boundary does not overlap with the object. While it is being determined in S203 that there is an object, the synthesis processing unit 35 does not change the position of the synthetic boundary and fixes the position of the synthetic boundary at the above-described boundary position. Then, when the object disappears from the overlapping part by passing the vehicle or in any other ways, it is determined in S203 that the object does not exist around the vehicle, and the position of the synthetic boundary is changed again in S204.

After executing S205, the synthesis processing unit 35 proceeds to S206.

Since S206 is the same processing as step S103 in FIG. 5, its description will be omitted.

Figure 9:
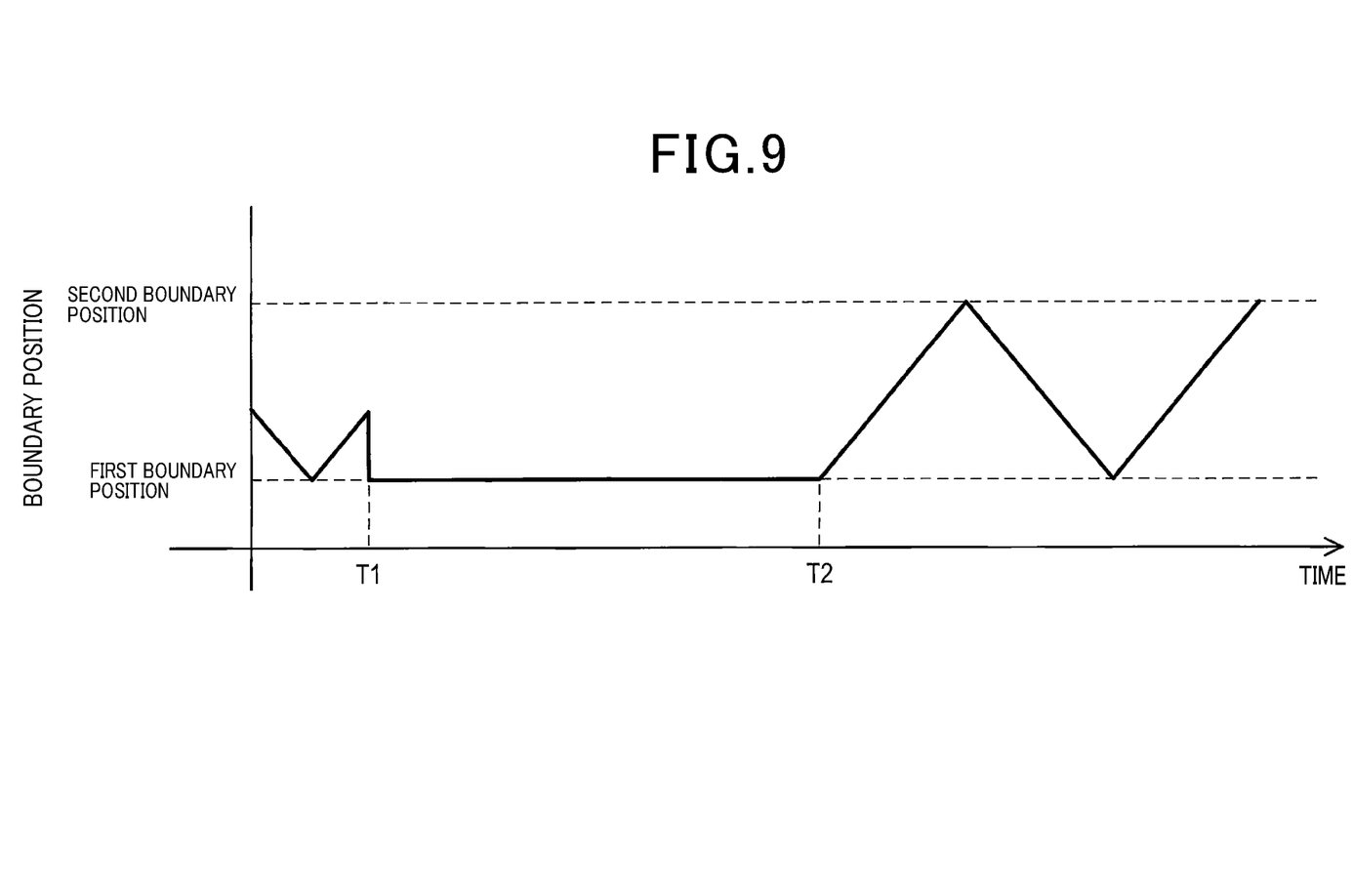
FIG. 9 is another diagram showing an alternative relationship between time and the position of the synthetic boundary.

FIG. 9 shows an example of how the position of the synthetic boundary changes when an object is detected in the overlapping part at time T1 and the object disappears from the overlapping part at time T2. In this example, a case is shown where an object is detected before the synthetic boundary that was at the first boundary position at a point in time earlier than time T1 reaches the second boundary position. Note that the boundary position on the side opposite to the object with respect to the position of the synthetic boundary at the point in time when the object is detected is the first boundary position. When an object is detected at time T1, the synthesis processing unit 35 determines that an object exists around the vehicle in S203, and moves the synthetic boundary to the first boundary position in S205 executed at approximately the same time as time T1. Then, while it is being determined in S203 that an object exists around the vehicle, it does not change the position of the synthetic boundary in S205 and fixes it at the first boundary position. When the object disappears from the overlapping part at time T2 and it is determined in S203 that the object does not exist, the synthesis processing unit 35 proceeds to S204, and changes the position of the synthetic boundary again from the first boundary position to the second boundary position.

3-3. Effects

According to the third embodiment described above in detail, the following effects can be obtained in addition to the above-described effects (1a) to (1c) of the first embodiment.

In the present embodiment, the vehicle is provided with a sensor for detecting an object around the vehicle, and it is determined whether an object exists in an overlapping part around the vehicle based on the vehicle information indicating the detection results of the sensor. Then, if it is determined that an object exists, the position of the synthetic boundary is changed so that it does not overlap with the object. Therefore, it is possible to display the detected object on at least the display screen of the display device 4 when an object exists in the overlapping part, In the present embodiment, S201 corresponds to the processing as an acquisition unit, S204 corresponds to the processing as a synthesis unit, and S206 corresponds to the processing as a display unit.

4. Other Embodiments

Embodiments for implementing the present disclosure has been described above, but the present disclosure is not limited to the above-described embodiments and can be implemented with various modifications.

(1) In the above embodiments, the position of the synthetic boundary changes at a constant rate, but the rate of change of the synthetic boundary is not limited to this. For example, the position of the synthetic boundary may be changed altering the rate.

(2) In the above embodiments, the position of the synthetic boundary changes between the first boundary position and the second boundary position so that it passes through an intermediate state. However, the way the position of the synthetic boundary changes is not limited to this. For example, the position of the synthetic boundary may change instantaneously between the first boundary position and the second boundary position without passing through an intermediate state. Specifically, for example, the synthetic boundary may be located only at the two boundary positions, the first boundary position and the second boundary position.

Figure 10:
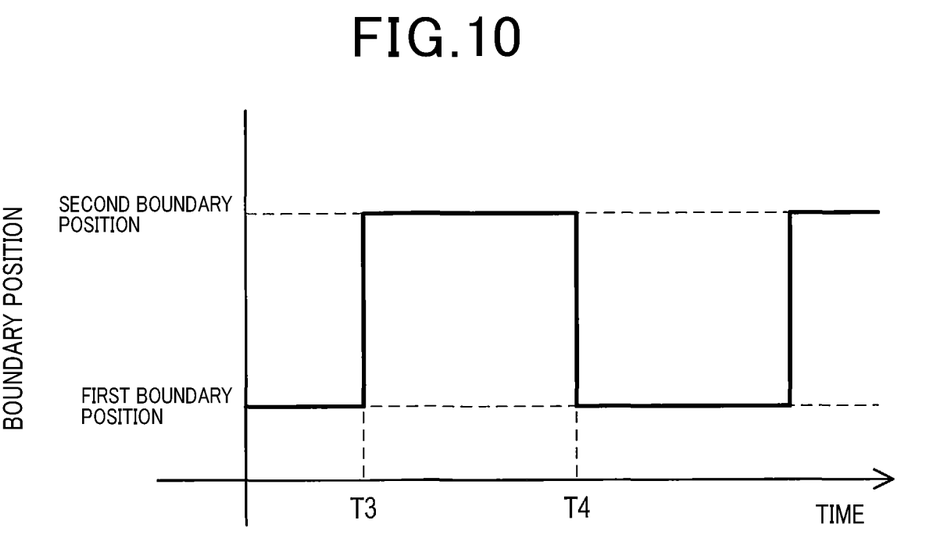
FIG. 10 is yet another diagram showing an alternative relationship between time and the position of the synthetic boundary.

An example of such changing of the boundary position is shown in FIG. 10. In the example of FIG. 10, the synthetic boundary that was located at the first boundary position until time T3 moves to the second boundary position at the moment it reaches time T3. Then, the synthetic boundary is located at the second boundary position until time T4, and moves to the first boundary position again at the moment it reaches time T4. The same transition is repeated thereafter.

Such configuration aids the driver in confirming that there is no object around the vehicle. In other words, in the configuration in which the position of the synthetic boundary is switched instantaneously without passing through an intermediate state, compared with the configuration in which the position of the synthetic boundary changes via an intermediate state, the driver can find out which of the captured images of the cameras is currently being displayed in the overlapping part more easily. The driver can confirm that there is no object around the vehicle by confirming on the display screen that none of the captured images of the cameras show an object. Therefore, according to the above configuration, the driver can confirm that there is no object around the vehicle more easily as compared with the configuration in which the position of the synthetic boundary changes via an intermediate position.

(3) In the second embodiment, the synthesis processing unit 35 changes the transparency of a plurality of captured images between 0 and 100. However, the way of changing the transparency is not limited to this. For example, the transparency of at least one of the captured images may be changed between a first value and a second value that are respectively larger than 0 and smaller than 100. For example, the first value may be 20 and the second value may be 80 and the synthesis processing unit 35 may change the transparency between 20 and 80.

According to such configuration, even if a part of an object does not appear on the display screen at a certain time, the transparency of the captured images changes in the overlapping part as time passes so as to display captured images that show the part of the object that was lost. Therefore, it is possible to prevent the driver from erroneously recognizing that there is no object around the vehicle.

(4) In the second embodiment, the transparency of only one of the overlapping captured images may be changed.

(5) In the above embodiments, the overlapping part and the boundary change range over which the synthetic boundary can change coincide with each other, but the boundary change range is not limited to this. For example, the boundary change range may be an area smaller than the overlapping part.

(6) In the above embodiments, the user may be able to switch between a mode in which the ratio of the display areas of the captured images is changed and a mode in which the transparency of the captured images is changed. Similarly, the user may be able to switch between a mode in which the position of the synthetic boundary changes via an intermediate state and a mode in which the position of the synthetic boundary changes without passing through an intermediate state.

(7) In the above embodiments, an example where the present disclosure is applied to top-view displaying in which bird's-eye images of the cameras 21 to 24 are displayed on the display device 4 has been described. However, the application examples of the present disclosure are not limited to this. For example, the present disclosure may be applied to an electronic rearview mirror including a liquid crystal display to display a synthesized image of images captured by the rear camera 22, the left camera 23, and the right camera 24.

(8) In the above embodiments, the number of the plurality of cameras mounted on the vehicle does need to be four.

(9) In the above embodiments, some or all of the functions executed by the synthesis processing unit 35 may be configured in a hardware manner, for example, by one or more ICs.

(10) Besides the above-described synthesis processing unit 35, the present disclosure may be realized in various forms such as a system including the synthesis processing unit 35 as a component, a program for causing a computer to function as the synthesis processing unit 35, a non-transitory substantive storage medium such as a semiconductor memory storing the program, and a method of changing the position of the synthetic boundary as time passes.

(11) A plurality of functions realized by a single component of the above embodiments may be realized by a plurality of components, or a single function realized by a single component may be realized by a plurality of components. Further, a plurality of functions realized by a plurality of components may be realized by a single component, or a single function realized by a plurality of components may be realized by a single component. Furthermore, a part of the configuration of the above embodiments may be omitted. Furthermore, at least a part of the configuration of one of the above embodiments may be added or substituted in the configuration of another of the embodiments described above. Embodiments of the present disclosure include any mode included in the technical concept specified by the language of the claims.

What is claimed is:

1. A display processing device comprising:
an acquisition unit configured to acquire a plurality of captured images that are captured by a plurality of cameras provided at a plurality of different positions on a vehicle, the plurality of captured images having an overlapping part in which imaging areas of the cameras partially overlap with each other;
a synthesis unit configured to combine the plurality of captured images acquired by the acquisition unit at the overlapping part of the plurality of captured images; and
a display unit configured to display an image synthesized by the synthesis unit on a display device mounted on the vehicle, wherein
the synthesis unit changes a position of a synthetic boundary, which is a boundary used when combining the plurality of captured images, as time passes, and
the synthesis unit alternatingly changes the position of the synthetic boundary from a first boundary position to a second boundary position, and from the second boundary position to the first boundary position, by passing through an intermediate state, which is a state between a state where the synthetic boundary is at the first boundary position, which is one end of an overlapping portion, and a state where the synthetic boundary is at the second boundary position, which is an other end of the overlapping portion.

2. The display processing device according to claim 1, wherein
the synthesis unit changes the position of the synthetic boundary between the first boundary position and the second boundary position without passing through the intermediate state which is the state between the state where the synthetic boundary is at the first boundary position and the state where the synthetic boundary is at the second boundary position.

3. The display processing device according to claim 1, wherein
the synthesis unit changes the position of the synthetic boundary by changing a ratio of display areas of the plurality of captured images in the overlapping part.

4. The display processing device according to claim 1, wherein
the synthesis unit changes the position of the synthetic boundary by changing transparency of the overlapping part of at least one of the plurality of captured images combined with each other.

5. The display processing device according to claim 1, wherein
in response to an object being detected in the overlapping portion at a time in which the synthetic boundary is at the first boundary position and not detected in the overlapping portion at a time in which the synthetic boundary is at the second boundary position, the synthesis unit moves the position of the synthetic boundary to the first boundary position and maintains the position of the synthetic boundary at the first boundary position, and
in response to the object being detected in the overlapping portion at a time in which the synthetic boundary is at the second boundary position and not detected in the overlapping portion at a time in which the synthetic boundary is at the first boundary position, the synthesis unit moves the position of the synthetic boundary to the second boundary position and maintains the position of the synthetic boundary at the second boundary position.

6. A display processing device comprising:
an acquisition unit configured to acquire a plurality of captured images that are captured by a plurality of cameras provided at a plurality of different positions on a vehicle, the plurality of captured images having an overlapping part in which imaging areas of the cameras partially overlap with each other;
a synthesis unit configured to combine the plurality of captured images acquired by the acquisition unit at the overlapping part of the plurality of captured images; and
a display unit configured to display an image synthesized by the synthesis unit on a display device mounted on the vehicle, wherein
the synthesis unit combines the plurality of captured images such that transparency of the overlapping part of at least one of the plurality of captured images combined with each other changes as time passes, and
the synthesis unit alternatingly changes a position of a synthetic boundary from a first boundary position to a second boundary position, and from the second boundary position to the first boundary position, by passing through an intermediate state, which is a state between a state where the synthetic boundary is at the first boundary position, which is one end of an overlapping portion, and a state where the synthetic boundary is at the second boundary position, which is an other end of the overlapping portion.

7. The display processing device according to claim 6, wherein
in response to an object being detected in the overlapping portion at a time in which the synthetic boundary is at the first boundary position and not detected in the overlapping portion at a time in which the synthetic boundary is at the second boundary position, the synthesis unit moves the position of the synthetic boundary to the first boundary position and maintains the position of the synthetic boundary at the first boundary position, and in response to the object being detected in the overlapping portion at a time in which the synthetic boundary is at the second boundary position and not detected in the overlapping portion at a time in which the synthetic boundary is at the first boundary position, the synthesis unit moves the position of the synthetic boundary to the second boundary position and maintains the position of the synthetic boundary at the second boundary position.

8. A display control device constituting a display processing system configured to present a driver a captured image showing surroundings of a vehicle, the display processing system further including a plurality of cameras provided at a plurality of different positions on the vehicle and a display device mounted on the vehicle, the display control device comprising:

an acquisition processing unit connected to the cameras and configured to acquire a plurality of captured images, which are captured by the cameras, having an overlapping part in which imaging areas of the cameras partially overlap with each other;

a memory storing a synthesis program which combines the plurality of captured images acquired by the acquisition processing unit at the overlapping part of the plurality of captured images;

a computing device configured to read out the synthesis program from the memory and execute the synthesis program; and a display processing unit connected to the display device and configured to output to the display device an image synthesized through an execution of the synthesis program by the computing device, wherein the memory further stores a time boundary position change program which changes a position of a synthetic boundary, which is a boundary used when the plurality of captured images are synthesized, as time passes, and the synthesis program alternatingly changes the position of the synthetic boundary from a first boundary position to a second boundary position, and from the second boundary position to the first boundary position, by passing through an intermediate state, which is a state between a state where the synthetic boundary is at the first boundary position, which is one end of an overlapping portion, and a state where the synthetic boundary is at the second boundary position, which is an other end of the overlapping portion.

9. The display control device according to claim 8, wherein in response to an object being detected in the overlapping portion at a time in which the synthetic boundary is at the first boundary position and not detected in the overlapping portion at a time in which the synthetic boundary is at the second boundary position, the synthesis program moves the position of the synthetic boundary to the first boundary position and maintains the position of the synthetic boundary at the first boundary position, and in response to the object being detected in the overlapping portion at a time in which the synthetic boundary is at the second boundary position and not detected in the overlapping portion at a time in which the synthetic boundary is at the first boundary position, the synthesis program moves the position of the synthetic boundary to the second boundary position and maintains the position of the synthetic boundary at the second boundary position.

10. A display control device constituting a display processing system configured to present to a driver a captured image showing surroundings of a vehicle, the display processing system further including a plurality of cameras provided at a plurality of different positions on the vehicle and a display device mounted on the vehicle, the display control device comprising:

an acquisition processing unit connected to the cameras and configured to acquire a plurality of captured images, which are captured by the cameras, having an overlapping part in which imaging areas of the cameras partially overlap with each other;

a memory storing a synthesis program which combines the plurality of captured images acquired by the acquisition processing unit at the overlapping part of the plurality of captured images;

a computing device configured to read out the synthesis program from the memory and execute the synthesis program; and a display processing unit connected to the display device and configured to output to the display device an image synthesized through an execution of the synthesis program by the computing device, wherein the memory further stores a transparency change program which combines the captured images such that transparency of the overlapping part of at least one of the plurality of captured images combined with each other changes as time passes, and the synthesis program alternatingly changes a position of a synthetic boundary from a first boundary position to a second boundary position, and from the second boundary position to the first boundary position, by passing through an intermediate state, which is a state between a state where the synthetic boundary is at the first boundary position, which is one end of an overlapping portion, and a state where the synthetic boundary is at the second boundary position, which is an other end of the overlapping portion.

11. The display control device according to claim 10, wherein in response to an object being detected in the overlapping portion at a time in which the synthetic boundary is at the first boundary position and not detected in the overlapping portion at a time in which the synthetic boundary is at the second boundary position, the synthesis program moves the position of the synthetic boundary to the first boundary position and maintains the position of the synthetic boundary at the first boundary position, and in response to the object being detected in the overlapping portion at a time in which the synthetic boundary is at the second boundary position and not detected in the overlapping portion at a time in which the synthetic boundary is at the first boundary position, the synthesis program moves the position of the synthetic boundary to the second boundary position and maintains the position of the synthetic boundary at the second boundary position.

* * * * *